United States Patent [19]

Booth et al.

[11] Patent Number: 4,704,410

[45] Date of Patent: Nov. 3, 1987

[54] MOLDED RIGID POLYURETHANE FOAMS PREPARED FROM AMINOALKYLPIPERAZINE-INITIATED POLYOLS

[75] Inventors: Llewellyn D. Booth; Jimmie D. Christen, both of Lake Jackson; William D. Clarke, Brazoria, all of Tex.

[73] Assignee: The Dow Chemical Company, Midland, Mich.

[21] Appl. No.: 880,380

[22] Filed: Jun. 30, 1986

[51] Int. Cl.$^4$ .............................................. C08G 18/14
[52] U.S. Cl. ........................................ 521/166; 528/73
[58] Field of Search ............................ 521/166; 528/73

[56] References Cited

U.S. PATENT DOCUMENTS

| | | | |
|---|---|---|---|
| 3,221,016 | 11/1965 | Currier et al. | 521/167 |
| 3,251,787 | 5/1966 | Bedoit | 528/73 |
| 3,251,788 | 5/1966 | Currier et al. | 521/167 |

*Primary Examiner*—Maurice J. Welsh

[57] ABSTRACT

This invention is an improvement in a process for preparing a molded rigid polyurethane or polyurethane-polyurea foam wherein a polyol having an average of at least 3 hydroxyl groups per molecule is reacted with a polyisocyanate in a mold in the presence of a blowing agent under conditions such that a rigid polyurethane or polyurethane-polyurea foam is formed. The improvement comprises employing as all or a portion of said polyol an aminoalkylpiperazine-initiated polyol having an equivalent weight from about 87 to about 500, said aminoalkylpiperazine-initiated polyol being employed in an amount sufficient to increase the cure rate of the foam relative to a similar foam prepared in the absence of the aminoalkylpiperazine-initiated polyol. Excellent flowability k-factors and rapid cures are obtained according to the invention.

13 Claims, No Drawings

MOLDED RIGID POLYURETHANE FOAMS PREPARED FROM AMINOALKYLPIPERAZINE-INITIATED POLYOLS

BACKGROUND OF THE INVENTION

This invention relates to rigid polyurethane foams, particularly to molded, rigid polyurethane foams prepared from aminoalkylpiperazine-initiated polyols.

Rigid polyurethane foams are commonly used for thermal insulation in refrigerators, freezers, roofs, walls, and the like. These foams generally exhibit good thermal insulation properties (sometimes expressed as a low "k-factor") and often provide some structural support as well.

In roofing and wall insulation, it is common to prepare the foam in advance of installation, in the form of boards. In preparing such boards, a polyurethane-forming reaction mixture is generally spread on a flat surface and allowed to freely rise as it reacts. After curing, the foams is cut to the desired dimensions.

In other applications, notably refrigerators, freezers, coolers and other thermal insulated containers, the polyurethane insulation is provided by polymerizing a polyurethane forming reaction mixture in situ in the space where insulation is desired. In such pour-in-place process, the polyurethane insulation takes the shape of the cavity in which it is polymerized and is therefore molded. In preparing molded polyurethane foam, the polyurethane forming reaction mixture must meet several requirements which are not presented in making board insulation.

For example, the reactivity of the foam formulation must be such that the smallest amount possible is needed to fill a particular volume. This results in the lowest raw material cost to the manufacturer. In addition, the post-cure shrinkage which is observed as the newly cured foam cools must be minimized in order to avoid a loss of insulative properties. Since this is commercially minimized by overpacking the mold (i.e., using an excess of the foam formulation over that required to barely fill the mold), reduced shrinkage also translates into higher raw material costs for the manufacturer. Another important property is compressive strength, which is desirably as great as possible. In the past, compressive strength has been improved by increasing the functionality of the polyol. Unfortunately, however, increased polyol functionality hurts the flowability of the foam formulation. Thus, improvements in one of these properties have usually been accompanied by worsening of the other.

Another substantial concern with molded rigid polyurethane foam is the cure time. The production of refrigerators, freezers, coolers and other articles containing foamed-in-place polyurethane insulation requires that the article be held in place with a fixture while the polyurethane foam formulation is curing. The fixture holds the article in the desired configuration, exerting pressure on the curing foam formulation, until curing is complete. If the fixture is released prematurely, the further expansion of the uncured foam formulation causes the article to become distorted. Since the availability of fixtures often determines the rate of production of these articles, a shorter cure cycle will result directly in increased production rate.

Because of the many demands placed on molded polyurethane foams, it has been difficult to find a formulation which performed satisfactorily in all aspects. As described, improvement in one area often was accompanied by a decreased performance in another. Accordingly, it would be desirable to provide a molded rigid polyurethane foam having generally good properties, and which in particular exhibits a short cure time, a low k-factor good flowability and compressive strength, and low post-cure shrinkage.

SUMMARY OF THE INVENTION

In one aspect, this invention is an improvement in a process for preparing a pour-in-place molded rigid polyurethane or polyurethane-polyurea foam wherein a polyol having an average of at least 3 hydroxyl groups per molecule is reacted with a polyisocyanate in a mold in the presence of a blowing agent under conditions such that a rigid polyurethane or polyurethane-polyurea foam is formed. The improvement comprises employing as all or a portion of said polyol an aminoalkylpiperazine-initiated polyol having an equivalent weight from about 87 to about 500, said aminoalkylpiperazine-initiated polyol being employed in an amount sufficient to decrease the cure rate of the foam relative to a similar foam prepared in the absence of the aminoalkylpiperazine-initiated polyol.

In another aspect, this invention is a poured-in-place, molded rigid polyurethane and/or polyurethane-polyurea foam which is the reaction product of a reaction mixture comprising (a) a polyisocyanate in an amount sufficient to provide an isocyanate index of about 80–500,
(b) an aminoalkylpiperazine-initiated polyol having an equivalent weight of about 87 to about 500,
(c) a blowing agent in the amount sufficient to provide a cellular structure to the foam,
(d) a surfactant in an amount sufficient to stabilize the reaction mixture until it is sufficiently cured to maintain a cellular structure and
(e) a catalytically effective amount of a catalyst for the reaction of the polyisocyanate and the aminoalkylpiperazine-initiated polyol.

The claimed process is characterized in providing a particularly short cure time. Accordingly, the rigid foam can be demolded in a relatively short period, permitting more frequent use of the fixture or mold, thereby allowing increased rate of production of multiple parts from an individual mold. This process also provides a rigid polyurethane foam better good k-factor, and non-shrink density than is normally expected from the use of a 3-functional polyol. A particular advantage is that excellent flowability is obtained simultaneously with excellent compressive strengths. The AAP polyol provides a flowability nearly as good as does a difunctional polyol, and provides a compressive strength which is normally characteristic of 4- or 5-functional polyol.

DETAILED DESCRIPTION OF THE INVENTION

The rigid polyurethane foam of this invention is prepared from a reaction mixture which comprises, as one component, a polyol having at least three active hydrogen atoms per molecule. At least a portion of such polyol comprises an aminoalkylpiperazine-initiated (AAP-initiated) polyether polyol. The proportion of the AAP-initiated polyol present is sufficient to measurably increase the cure rate of the rigid foam compared to that exhibited by a similar foam in which the AAP-initiated polyol is not employed.

The cure rate for molded polyurethane foam formulations is conveniently measured by injecting the formulation into a mold, permitting it to cure for a predetermined period while the mold walls are restricted by means of a fixture, and then removing the fixture from the mold. If curing is incomplete, the molded polyurethane foam will expand somewhat after the pressure is released. Cure rate is then measured in one of two ways. The time required so that no demold expansion of the foam occurs can be used as a measure of the cure rate, with lesser times indicating a faster cure rate. More typically, however, industrial processes can tolerate a certain amount of demold expansion. In these processes, it is common practice to employ the shortest demold time at which a tolerable amount of demold expansion occurs. Accordingly, cure rate can be determined indirectly by applying pressure to the mold for a predetermined period of time which is less than that required for complete cure, and then measuring the amount of demold expansion which occurs. Smaller demold expansions indicate faster curing times. For the purposes of this invention, an increased cure rate is indicated either by a shorter period of time to complete cure (no demold expansion), or by a decreased demold expansion upon releasing pressure on the mold after a predetermined cure time which is less than required for a complete cure. Preferably, the rigid foam formulation of this invention exhibits a demold expansion of less than about 10%, preferably less than about 5%, more preferably less than about 3.5%. When measured as a post-demold increase in thickness using a 200×20×5 cm brett mold, as is regularly used in the industry for evaluating rigid foam, this corresponds to a post-mold expansion of less than about 0.5 cm, preferably less than 0.25 cm, more preferably less than about 0.175 cm. Alternatively, the rigid foam formulation of this invention advantageously provides, in preparing molded foams of less than about 5 cm thickness, a tolerable demold expansion at a cure time of four minutes or less, preferably about 3.5 minutes or less, more preferably about 3.0 minutes or less, and most preferably less than about 3 minutes.

The AAP-initiated polyol is the reaction product of an aminoalkylpiperazine with an alkylene oxide so that the resulting hydroxyl-terminated polyether has an equivalent weight from about 87 to about 500, preferably about 96 to about 350, more preferably about 100 to about 250. Preferred alkylene oxides include ethylene oxide, propylene oxide, 1,2-butylene oxide, 2,3-butylene oxide, hexylene oxide, and other C5-C12 oxiranes, as well as styrene oxide and epihalohydrins such as epichlorohydrin. More preferred are ethylene oxide, propylene oxide and mixtures thereof.

The aminoalkylpiperazine can be represented by the structure:

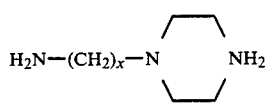

wherein x is a number from about 1 to about 10, preferably about 2 to about 4 and more preferably 2. The aminoalkyl piperazine can also be substituted by any inert substituent such as alkyl, halogen and the like. Most preferably, the aminoalkylpiperazine is aminoethylpiperazine.

The AAP-initiated polyol can be the sole polyol employed in making the rigid foam. Alternatively, other polyols which are not AAP-initiated polyol can be used in conjunction with the AAP-initiated polyol. In such case, the AAP-initiated polyol is present in an amount sufficient to increase the cure rate of the reaction mixture by a measurable amount compared to a similar reaction mixture in which the AAP-initiated polyol is absent. Advantageously, the AAP-initiated polyol comprises about 20 to about 100, preferably about 40 to 100, more preferably about 40 to about 80 percent by weight of the polyols employed.

The other polyol is of any type which is suitable, when employed in conjunction with the AAP-initiated polyol, for preparing rigid polyurethane foam. Such other polyol advantageously has an equivalent weight of about 50 to about 400, preferably about 70 to about 200 and more preferably about 70–150. Such other polyol also preferably has an average of at least 3 active hydrogen atoms per molecule, more preferably about 3 to 8, and most preferably about 4 to 8 such hydrogen atoms. If difunctional polyols are employed, it is preferred to employ them in minor amounts, and more preferred to employ them in conjunction with high functionality materials so the average functionality of all the polyols used is at least 3.0.

Suitable as the other polyol are polyether polyols, polyester polyols, polyhydroxyl-containing phosphorous compounds, hydroxyl-terminated acetal resins, hydroxyl-terminated amines and polyamines, and the like. Examples of these and other suitable polyol are described more fully in U.S. Pat. No. 4,394,491, particularly in columns 3–5 thereof. Most preferred for preparing rigid foams, on the basis of performance, availability and cost, is a polyether polyol prepared by adding an alkylene oxide to an initiator having from about 3-8, preferably 4-8 active hydrogen atoms. Exemplary such polyether polyols include those commercially available under the trade names Voranol 202, Voranol 360, Voranol 370, Voranol 446, Voranol 490, Voranol 575, Voranol 800, all sold by The Dow Chemical Company, and Pluracol 824, sold by BASF Wyandotte.

In making the rigid polyurethane foam, the polyol(s) are reacted with a polyisocyanate. Organic polyisocyanates which may be used include aromatic, aliphatic and cycloaliphatic polyisocyanates and combinations thereof. Representative of these types are diisocyanates such as m- or p-phenylene diisocyanate, toluene-2,4-diisocyanate, toluene-2,6-diisocyanate, hexamethylene-1,6-diisocyanate, tetramethylene-1,4-diisocyanate, cyclohexane-1,4-diisocyanate, hexahydrotoluene diisocyanate (and isomers), naphthylene-1,5-diisocyanate, 1-methoxyphenyl-2,4-diisocyanate, diphenylmethane-4,4'-diisocyanate, 4,4'-biphenylenediisocyanate, 3,3'-dimethoxy-4,4'-biphenylenediisocyanate and 3,3'-dimethyldiphenylpropane-4,4'-diisocyanate; triisocyanates such as toluene-2,4,6-triisocyanate, and polyisocyanates such as 4,4'-dimethyldiphenylmethane2,2',5,5'-tetraisocyanate and the diverse polymethylenepolyphenylpolyisocyanates.

A crude polyisocyanate may also be used in the practice of the present invention, such as the crude toluene diisocyanate obtained by the phosgenation of a mixture of toluene diamines or the crude diphenylmethane diisocyanate obtained by the phosgenation of crude diphenylmethanediamine. The preferred undistilled or crude polyisocyanates aare disclosed in U.S. Pat. No. 3,215,652.

Especially preferred are methylene-bridged polyphenylpolyisocyanates, due to their ability to crosslink the polyurethane. The isocyanate index (ratio of equivalents of isocyanates to equivalents of active hydrogen-containing moieties) is advantageously from about 0.9 to about 10, preferably about 1.0 to about 4.0, more preferably about 1.0–1.5.

In addition to the AAP-initiated polyol, other polyol (if any) and the polyisocyanate, a blowing agent is employed to impart a cellular structure to the polyurethane. Useful blowing agents include those materials which generate a gas under the conditions of the polymerization of the reaction mixture. Exemplary such materials include water, which reacts with isocyanate groups to liberate carbon dioxide, low boiling halogenated hydrocarbons such as a fluorocarbon, finely divided solids such as pecan flour, the so-called "azo" blowing agents which liberate nitrogen, and the like. Preferred blowing agents include water and the low boiling halogenated hydrocarbons. When the molded polyurethane foam is desired to have thermal insulative characteristics, the blowing agent preferably comprises a low boiling halogenated hydrocarbon. Such blowing agents remain in the cells of the foam and contribute to the insulating properties thereof. Exemplary low boiling halogenated hydrocarbons include methylene chloride, tetrafluoromethane, trifluorochloromethane, dichlorodifluoromethane and the like.

The blowing agent is used in an amount sufficient to provide a cellular polyurethane of a desired density. When water is used as the blowing agent, about 0.15 to about 8, preferably about 0.5 to about 4, more preferably about 0.5 to about 2 parts by weight water are used per part polyol. Halogenated hydrocarbons are advantageously used in an amount from about 5 to about 100, preferably about 20–60 parts per 100 parts by weight polyol. Mixture of water and halogenated hydrocarbons can also be used.

In addition to the foregoing critical components, the reaction mixture may also contain various other additives. Examples of such additives are surfactants, pigments, colorants, fillers, fibers, antioxidants, catalysts, flame retardants, stabilizers and the like.

It is generally highly preferred to employ a minor amount of a surfactant to stabilize the foaming reaction mixture until it cures. Such surfactants advantageously comprise a liquid or solid organosilicone surfactant. Other, less preferred surfactants include polyethylene glycol ethers of long chain alcohols, tertiary amine or alkanolamine salts of long chain alkyl acid sulfate esters, alkyl sulfonic esters and alkyl arylsulfonic acids. Such surfactants are employed in amounts sufficient to stabilize the foaming reaction mixture against collapse and the formation of large, uneven cells. Typically, about 0.2 to about 5 parts of the surfactant per 100 parts by weight polyol are sufficient.

One or more catalysts for the reaction of the polyol (and water, if present) with the polyisocyanate are advantageously used. Any suitable urethane catalyst may be used, including tertiary amine compounds and organometallic compounds. Exemplary tertiary amine compounds include triethylenediamine, n-methyl morpholine, pentamethyl diethylenetriamine, tetramethylethylene diamine, 1-methyl-4-dimethylaminoethylpiperazine, 3-methoxy-N-dimethylpropylamine, n-ethyl morpholine, diethylethanolamine, n-coco morpholine, n,n-dimethyl-n',n'-dimethyl isopropylpropylenediamine, N,N-diethyl-3-diethylaminopropylamine, dimethylbenzylamine and the like. Exemplary organometallic catalysts include organomercury, organolead, organoferric, and organotin catalysts, with organotin catalysts being preferred among these. Suitable organotin catalysts include stannous chloride, tin salts of carboxylic acids such as dibutyltin di-2-ethyl hexanoate, as well as other organometallic compounds such as are disclosed in U.S. Pat. No. 2,846,408. A catalyst for the trimerization of polyisocyanates, such as an alkali metal alkoxide, may also optionally be employed herein. Such catalysts are used in an amount which measurably increases the rate of reaction of the polyisocyanate. Typical amounts are about 0.001 to about 1 part of catalyst per 100 parts by weight of polyol.

Suitable pigments, fillers and fibers include titanium dioxide, carbon black, kaolin and other clays, alumina trihydrate, calcium carbonate, graphite fibers, glass fibers, polymeric fibers, flaked or milled glass and the like.

In preparing a rigid polyurethane foam according to this invention, the polyol and polyisocyanate are reacted in an enclosed area (mold) such that the reacting mixture rises to partially or totally fill said enclosed space. The enclosed area will normally have a vent to release entrapped air as the reaction mixture foams and expands. In preparing the foam, it is normal practice to mix all components except the polyisocyanate together, and to then contact this mixture with the polyisocyanate inside the mold or immediately before filling the mold. Various commercially available foam machines, such as a Martin-Sweets Flex 30 foam machine, as Admiral 2000-2HP foam machine, or an Accuratio high pressure foam machine are useful to mix the polyol and polyisocyanate components and deliver the mixture. The polyol and polyisocyanate are advantageously mixed together at a temperature from about 0° to about 50° C., more preferably about 10°–40° C.

In filling the mold, it is preferred to employ an amount of reaction mixture somewhat in excess of that needed to barely fill the mold in order to minimize shrinkage. About a 3–20% excess is normally sufficient for this purpose. An advantage of this invention is that very little excess reaction mixture is required compared to many conventional systems.

The reaction mixture, when placed into the mold, reacts and expands to fill the available space. After foaming, the mixture hardens to a rigid foam. A distinct advantage of this invention is that the reaction mixture cures very rapidly, permitting more frequent use of the molds, or fixtures which exert pressure on the mold during curing. In commercial processes, this can result in increased production in a given period of time. Surprisingly, the rapid cure attained with this invention is achieved while maintaining a reaction profile which permits the maximum expansion of the reaction mixture. In the foaming process, various reactions are occurring simultaneously, and in order to achieve maximum expansion of the reaction mixture, these reactions must be sequenced so that, for instance, the blowing reactions are not completed before the polyol and polyisocyanate have begun to gel. Previous attempts to speed the cure rate of rigid polyurethane foam formulations have distorted the reaction profile so that the ability of the reaction mixture to fill a given volume was diminished. A characteristic of this invention is that rapid cures and excellent "flowability", i.e. the ability to fill a given volume with a minimum of material, are achieved.

The molded rigid polyurethane foam prepared according to this invention is useful as insulation for refrigerators, freezers, coolers, walls, roofing and the like.

The following examples are provided to illustrate the invention but are not intended to limit the scope thereof. All parts and percentages are by weight unless otherwise indicated.

EXAMPLE 1

Active hydrogen-containing composition Sample Nos. 1–4 are prepared by mixing together ingredients as indicated in Table 1 following:

TABLE 1

| | Parts by Weight Sample Number | | | |
|---|---|---|---|---|
| Ingredient | 1 | 2 | 3 | 4 |
| AEP Polyol[1] | 100 | 50 | 60 | 50 |
| Polyol A[2] | — | 50 | 20 | — |
| Polyol B[3] | — | — | 20 | — |
| Polyol C[4] | — | — | — | 50 |
| Water | 1.15 | 1.15 | 1.15 | 1.15 |
| Silicone Surfactant[5] | 1.85 | 1.85 | 1.85 | 1.85 |
| Catalyst[6] | 1 | 1.5 | 2.25 | 2.25 |
| Refrigerant 11A[7] | 46 | 46 | 46 | 46 |

[1]An aminoethylpiperazine-initiated poly(propylene oxide) having an equivalent weight of about 118.
[2]A poly(propylene oxide) polyol having an average functionality of about 4.0–4.5 and an equivalent weight of about 115.
[3]A poly(propylene oxide) having an average functionality of about 6.5–7.0 and an equivalent weight of about 152.
[4]A poly(propylene oxide) having an average functionality of about 5.0 and an equivalent weight of about 115.
[5]A liquid organosilicone surfactant
[6]A pentamethyldiethylenetriamine catalyst, commercially available as Polycat-5, from Air Products and Chemicals, Inc.
[7]Trichloromonofluoromethane Each active hydrogen containing composition is individually reacted with a methylene-bridged polyphenylpolyisocyanate having an average functionality of about 2.7. The isocyanate index is 1.08 in all cases. The reactants are mixed and delivered on an Accuratio high pressure foam machine. The temperature of the polyol mixture component is about 20° C. and the temperature of the isocyanate component is about 30° C. The throughput of foam is about 40 lb/min. A portion of the reaction mixture is delivered to a brett mold measuring 200×20×5 cm to evaluate flowability, non-shrink density, creame and gel time. An additional amount of the reaction mixture is delivered to a 2'×2'×2" panel to evaluate compressive strength and "k factor". A small amount is delivered to a cup to evaluate cream time and gel time.

Flowability is measured by filling the brett mold with an amount of the reaction mixture such that, upon expanding, it just fills the mold. The mold is held in a vertical position (i.e., the 200 cm rise direction) and the foaming polymer is allowed to expand against its own weight in the mold. After the foam has risen and reacted, the density of the foam is measured to determine flowability. A lower density indicates better flowability.

Non-shrink density is determined by overpacking the brett mold incrementally until a foam is obtained which does not shrink after curing and cooling. The density of the resulting foam is measured to determine the non-shrink density. Lower values are preferred.

Post expansion is evaluated by releasing the pressure on the mold after a predetermined in-mold cure time, and measuring the subsequent expansion of the foam along the 5 cm side. Lower values are preferred. In this example, the in-mold cure time is 3 or 4 minutes, as indicated in Table 2 following.

Cream time is measured by pouring a portion of the newly mixed reaction mixture into a cup and observing the time, measured from the time that the polyol and polyisocyanate are contacted, for a visible reaction to occur. Gel time is the time required for the reaction mixture to form a gel.

k-factor is measured according to ASTM C-518, and compressive strength measured according to ASTM D-1621.

The results of this testing are as reported in Table 2 following.

TABLE 2

| Sample No. | 1 | 2 | 3 | 4 |
|---|---|---|---|---|
| Cream Time, sec | 2 | 2 | 2 | 2.5 |
| Gel Time, sec | 10 | 20 | 15 | 16 |
| brett mold | | | | |
| Flowability, lb/ft$^3$ | 1.91 | 1.82 | 1.76 | 1.77 |
| Non-shrink dnsty, lb/ft$^3$ | N.D. | 2.02 | 2.02 | 2.05 |
| Post Expansion, in | | | | |
| 4 minute cure | 0.03 | 0.063 | N.D. | 0.021 |
| 3 minute cure | N.D. | N.D. | 0.139 | 0.068 |
| Panel Mold | | | | |
| k-factor BTU-in/ft$^2$-°F.-h | | | | |
| top | 0.115 | 0.115 | 0.114 | 0.117 |
| bottom | 0.112 | 0.115 | 0.113 | 0.116 |
| Compressive Strength, psi | | | | |
| x-direction | 13.7 | 15.8 | 15.2 | 15.5 |
| y-direction | 25.1 | 25.3 | 26.6 | 29.6 |
| z-direction | 15.5 | 19.2 | 17.1 | 17.8 |
| density, lb/ft$^3$ | 1.93 | 1.98 | 1.95 | 1.94 |

N.D. — not determined

As can be seen from the data in Table 2, all foams exhibit excellent overall properties. Of particular note are the post expansion values, all of which are under 0.1 inch (0.25 cm) at 4 minutes and well under 0.2 (0.5 cm) inches at 3 minutes. These values indicate that in commercial processes, demolding at three or four minute cure times can be done. The flowability values are also good to excellent, indicating that despite the rapid cure, the rise profiles of these foams remain goood. In addition, the foams all exhibit excellent compressive strengths and k-factors.

What is claimed is:

1. In a process for preparing a pour-in-place, molded rigid polyurethane or polyurethane-polyurea foam wherein a polyol having an average of at least 3 hydroxyl groups per molecule is reacted with a polyisocyanate in a mold in the presence of a blowing agent under conditions such that a rigid polyurethane or polyurethane-polyurea foam is formed, the improvement wherein all or a portion of said polyol comprises an AAP-initiated polyol having an equivalent weight from about 87 to about 500, said AAP-initiated polyol being employed in an amount sufficient to increase the cure rate of the foam relative to a similar foam prepared in the absence of the AAP-initiated polyol.

2. The process of claim 1 wherein said AAP-initiated polyol is present in an amount such that the foam exhibits an expansion of less than about 5% when demolded 4 minutes after the polyol is contacted with the polyisocyanate.

3. The process of claim 2 wherein said AAP-initiated polyol is aminoethylpiperazine-initiated.

4. The process of claim 3 wherein said aminoethylpiperzine-initiated polyol comprises about 40-80% by weight of the polyols.

5. The process of claim 4 wherein said foam exhibits an expansion of less than about 3.5% when demolded 4 minutes after the polyol is contacted with the polyisocyanate.

6. The process of claim 4 wherein said polyol is reacted with the polyisocyanate in the presence of a catalytic amount of a catalyst for the reaction of a polyol and a polyisocyanate, a silicone surfactant in an amount sufficient to stabilize the reacting mixture until it is sufficiently cured to maintain a cellular structure, and a blowing agent in an amount sufficient to provide a cellular structure to the foam.

7. A poured-in-place molded rigid polyurethane and/or polyurethane-polyurea foam which is the reaction product of a reaction mixture comprising
(a) a polyisocyanate in an amount sufficient to provide an isocyanate index of about 80-500,
(b) an AAP-initiated polyol having an equivalent weight of about 87 to about 500,
(c) a blowing agent in an amount sufficient to provide a cellular structure to the foam,
(d) a surfactant in an amount sufficient to stabilize the reaction mixture until it is sufficiently cured to maintain a cellular structure and
(d) a catalytically effective amount of a catalyst for the reaction of the polyisocyanate and the AAP-initiated polyol.

8. The foam of claim 7 which exhibits an expansion of less than about 5% when demolded 4 minutes after the polyol is contacted with the polyisocyanate.

9. The foam of claim 8 wherein the AAP-initiated polyol is an aminoethylpiperazine-initiated polyol.

10. The foam of claim 9 further comprising a polyol which is not aminoalkylpiperazine-initiated, and wherein said aminoethylpiperzine-initiated polyol comprises about 40 to about 80 weight percent of the polyol(s).

11. The foam of claim 10 which exhibits an expansion of less than about 3.5% when demolded 4 minutes after the polyol is contacted with the polyisocyanate.

12. The process of claim 6 wherein the aminoalkylpiperazine-initiated polyol has an equivalent weight from about 100 to about 250.

13. The foam of claim 11 wherein the aminoalkylpiperazine-initiated polyol has an equivalent weight from about 100 to about 250.

* * * * *